Dec. 6, 1960  E. F. WELLER, JR  2,962,892
AUTOMATIC ENGINE INDICATOR PLOTTER
Filed Aug. 31, 1955  4 Sheets-Sheet 1

INVENTOR
Edward F. Weller, Jr.
BY E. W. Christen
ATTORNEY

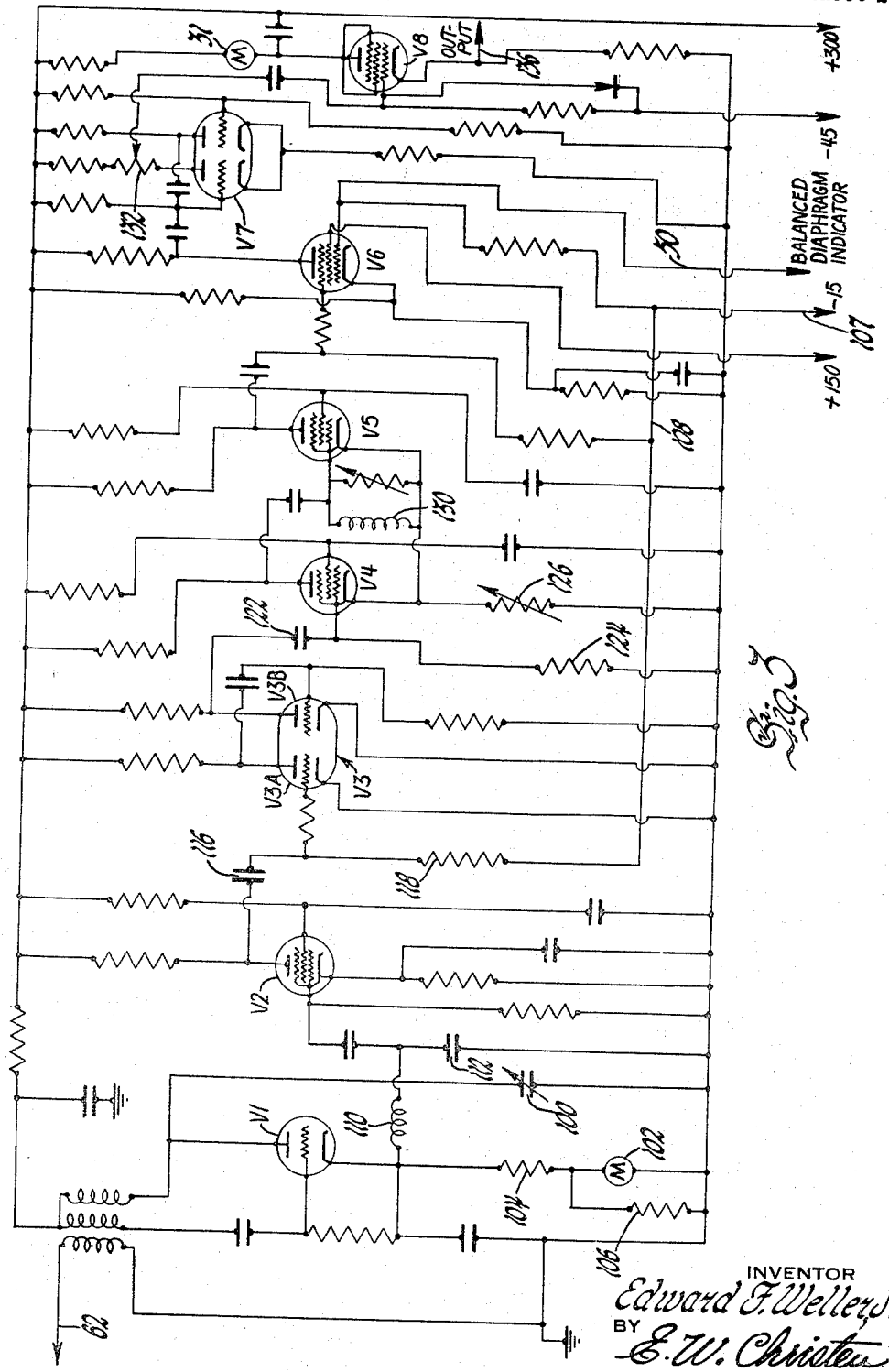

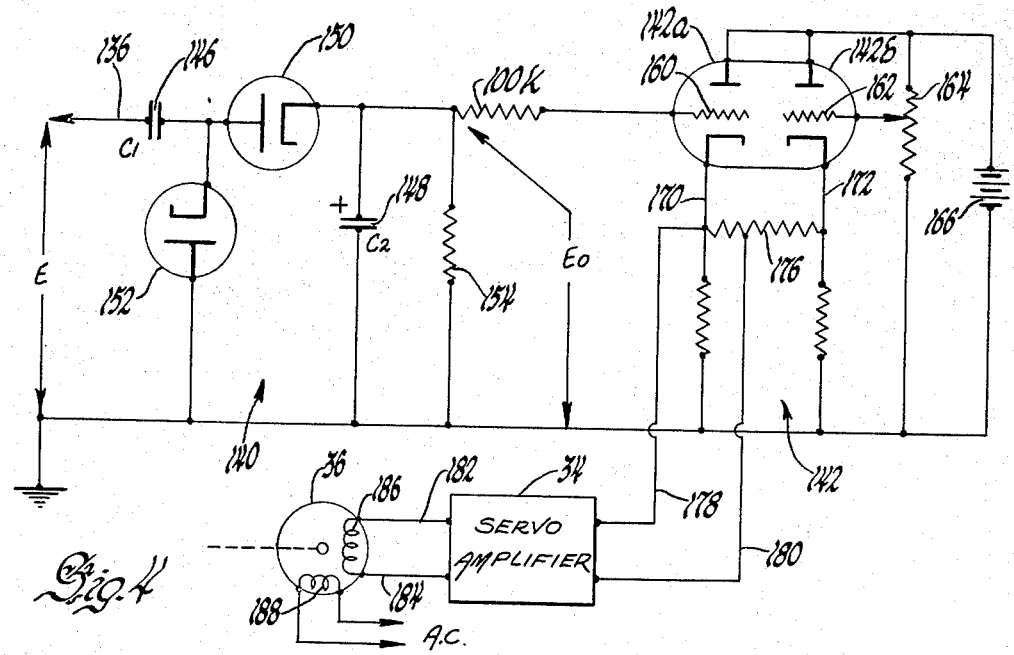

United States Patent Office 2,962,892
Patented Dec. 6, 1960

2,962,892
AUTOMATIC ENGINE INDICATOR PLOTTER

Edward F. Weller, Jr., Detroit, Mich., assignor to General Motors Corporation, Detroit, Mich., a corporation of Delaware Filed Aug. 31, 1955, Ser. No. 531,679

6 Claims. (Cl. 73—116)

This invention relates to a method of and apparatus for obtaining indicator cards or diagrams relating cylinder pressure with crank angle or piston displacement of internal combustion engines and the like and, more particularly, to a novel method of and apparatus for obtaining such diagrams with a balanced diaphragm transducer.

The invention has among its objects to provide a method of and apparatus for obtaining indicator diagrams with a balanced diaphragm pressure transducer in which the balancing pressure supplied to one side of the balanced diaphragm pickup is measured or determined as a dependent variable with crank angle as the known or independent variable.

Another object is to provide a balanced diaphragm indicator apparatus in which the balancing pressure supplied to the balanced diaphragm pickup transducer is automatically and continuously regulated to correspond to a measure of cylinder pressure at a predetermined sampled crank angle.

Another object is to provide a balanced diaphragm indicator apparatus in which the balancing pressure supplied to the balanced diaphragm transducer is further automatically and continuously varied to correspond to a measure of the pressure existing within the engine cylinder at each crank angle throughout a continuously and progressively scanned range of crank angles.

A further object is to provide a balanced diaphragm indicator apparatus for automatically plotting a continuous and uninterrupted record of engine cylinder pressure over a continuous progressive range of crank angles.

Another object is to provide a balanced diaphragm indicator apparatus in accordance with the above in which a plurality of such records for different engine speeds or conditions may be plotted on the same chart or recording medium without requiring engine shutdown.

Another object is to provide a balanced diaphragm indicator system that accounts for variations in engine cylinder pressure from cycle to cycle at any predetermined crank angle and provides statistically averaged data representative of such cyclical pressure variations.

Still another object is to provide such apparatus which is specially adapted to provide a definite indication of the median or other representative curves of the cyclical variations of cylinder pressure for any predetermined crank angle or for each crank angle of a continuously and progressively scanned range of crank angles.

According to the invention, the balancing pressure applied to one side of a balanced diaphragm pressure transducer is adjusted until the time at which the contacts of the balanced diaphragm pickup transducer are caused to close or open coincides with the occurrence of a timing mark pickup pulse whose position in time and space corresponds to a predetermined crank angle position. The timing mark pickup pulse and a signal developed by the "make" and "break" of the contacts of the balanced diaphragm transducer are applied to a coincidence detector that determines whether any portion of the interval during which the balanced diaphragm contacts are closed coincides with the occurrence of the crank angle timing pulse. The coincidence detector and its associated apparatus determine whether the balancing pressure applied to the balanced diaphragm indicator should be raised or lowered to cause the leading or trailing edge of the balanced diaphragm signal to coincide exactly with the timing mark pulse and thus attain a system equilibrium condition when the balancing pressure will correspond to the cylinder pressure existing at the sampled crank angle.

Further, according to the invention the balancing pressure may be adjusted or regulated automatically by a self-balancing servo positioning system of the on-off sampling variety operated from the output of the coincidence detector. According to another feature of the invention, the position of the timing mark pickup or generator may be varied linearly in a continuous and progressive manner by a scanning motor to scan any desired range of crank angles and the pressure regulating servo system caused to vary automatically the balancing pressure in a continuous and uninterrupted manner over a pressure range corresponding to the scanned range of crank angles. A two-axis chart recorder controlled by the crank angle scanning motor and a signal proportional to the servo varied balancing pressure is employed to provide an automatically plotted curve of cylinder pressure versus crank angle.

In accordance with another feature of the invention, the rate of coincidence of the crank angle timing pulse and the balanced diaphragm signal can be adjusted at will by changing the servo loop equilibrium or balance point as by adjusting the amplitude of a reference voltage that is combined with a signal which is proportional to the output of the coincidence detector, thereby to account for cyclic variations of cylinder pressure at any given crank angle. In this manner the invention is adapted to provide recorded pressures that are a median or any desired modified median of the cyclic pressure variations.

The above and other objects, features and advantages of the present invention will appear more fully from the following detailed description and drawings wherein:

Fig. 3 is a schematic electric circuit diagram of a part of the apparatus of Fig. 1;

Fig. 4 is a schematic electric circuit diagram of another part of the apparatus of Fig. 1;

Figure 2:
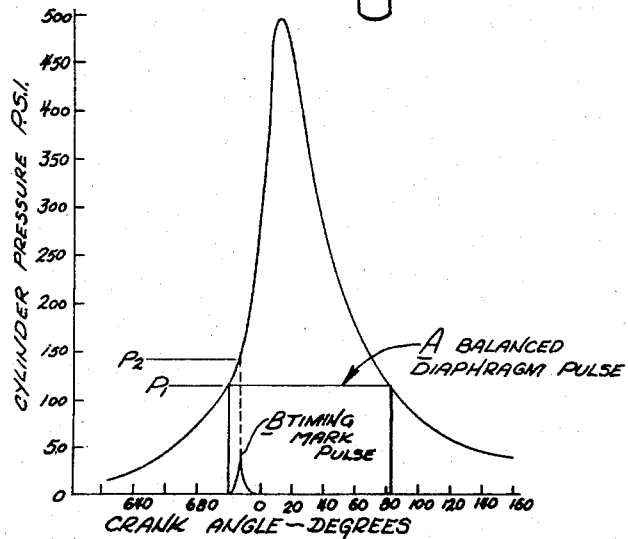
Fig. 2 is a diagram useful in understanding the operation of a part of the present invention.
Figure 6:
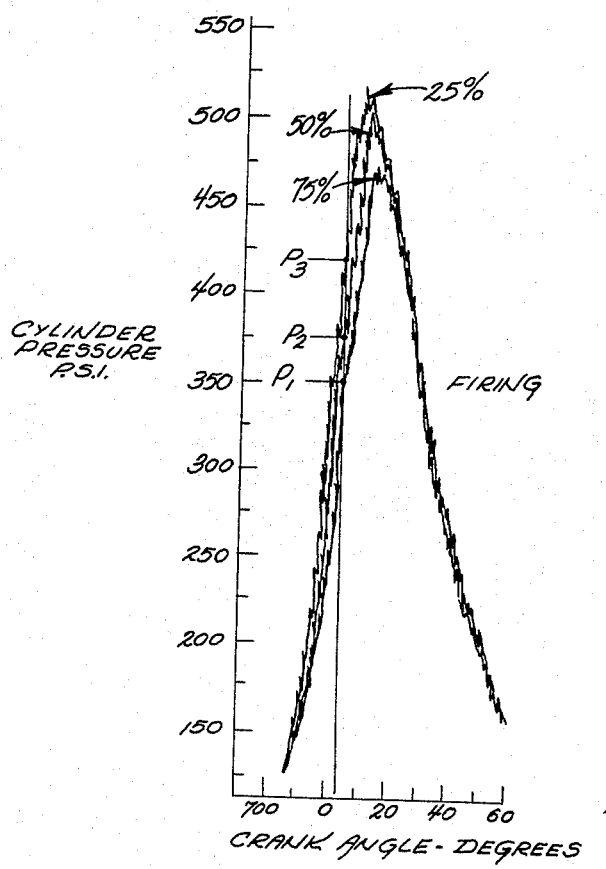
Figure 7:
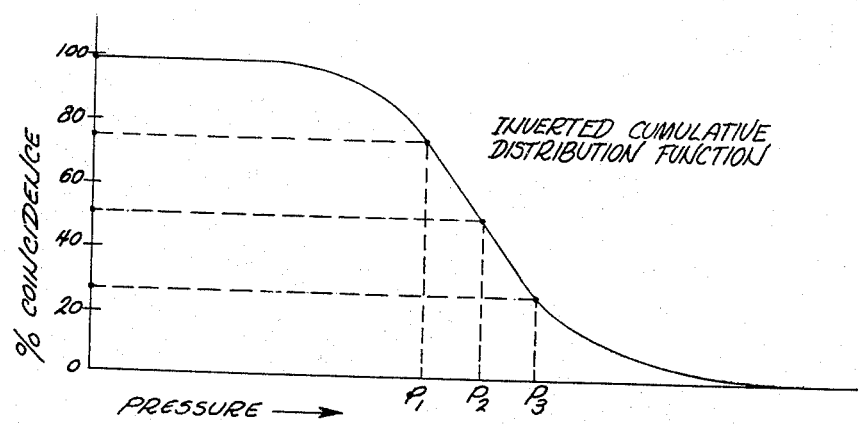

Figs. 5A–K are electrical voltage wave forms obtained at various parts of the circuit of Fig. 2;

Fig. 6 is a record of several pressure diagrams obtained at different operating conditions with the apparatus of the present invention; and Fig. 7 illustrates a useful form of pressure distribution curve that may be obtained from the data plotted by the present invention.

Figure 1:
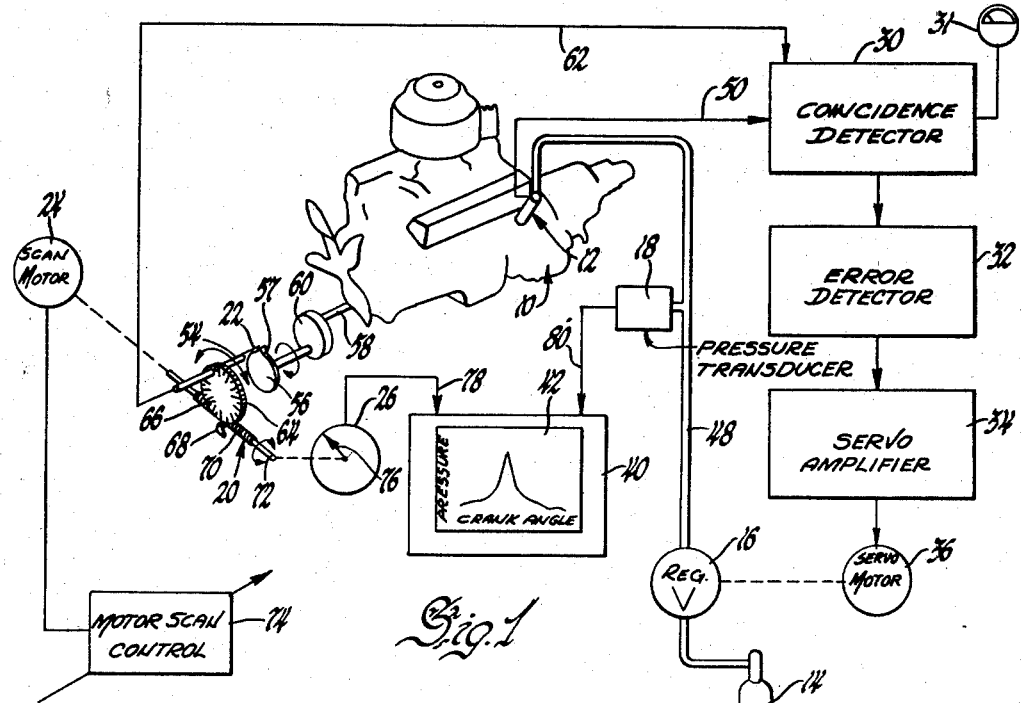
Fig. 1 is a block diagrammatic and schematic showing of an automatic pressure plotter in accordance with the present invention installed in an internal combustion engine.

Referring to the drawings, Fig. 1 illustrates the major components of a balanced diaphragm pressure plotter apparatus in accordance with the present invention for plotting an automatic pressure versus crank angle diagram of an automobile engine shown at 10. The apparatus includes, in the main, a balanced diaphragm pickup transducer 12, a high pressure source of balancing pressure 14 having an adjustable regulator valve 16 and a pressure transducer 18 connected between the regulator valve and balanced diaphragm transducer; a variable angle pulse generator indicated generally at 20 and including a timing mark pulse generator 22, a scanning drive motor 24 and a position indicator transducer 26; a coincidence detector 30 operated from the timing mark pulse generator and the balanced diaphragm transducer, an error detector 32, and a servo amplifier 34 and associated servo motor 36 for adjusting the valve 16; and a two-axis X—Y function plotter 40 having a movable chart 42 whose position is controlled by a signal derived from the position indicator transducer 26, and a pen whose movement is controlled by a signal derived from the pressure transducer 18.

Figure 1A:
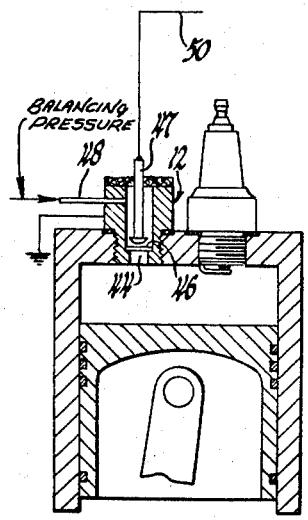
Fig. 1A is a part of the apparatus shown in Fig. 1.

As shown at Fig. 1A the balanced diaphragm pickup transducer 12 is mounted in a threaded opening 44 specially provided in the cylinder block of the test engine with one side of the flexible or movable diaphragm 46 exposed to the pressure within the engine cylinder. The other side of the balanced diaphragm is connected by pressure line 48 to the high pressure source 14, which may be a nitrogen tank, through the adjustable valve or pressure regulator 16. Spaced from the flexible diaphragm 46 and adapted to be contacted thereby is a stationary contact electrode 47 that alternately makes and breaks a grounding circuit over conductor 50 when the dynamic pressure within the engine cylinder rises above and falls below, respectively, the balancing pressure applied to the diaphragm.

The pressure regulator 16 may be designed along the lines of known pressure regulator valves such, for example, as the Moore Nullmatic Pressure Regulator, while the pressure transducer 18 may be of any commercially available variety such as a type 9–3 transonics pressure transducer.

The timing mark pickup generator 22 may comprise a conventional capacity pickup probe 54 and a single-toothed reference wheel 56 that is driven from the engine crankshaft 58 at half crankshaft speed through a 2:1 gear reducer 60, where the engine 10 is a four cycle engine. The capacity pickup probe 54 is mounted on a rotatable disc or worm gear 64 whose angular position is independent of engine rotation. The angular position of the disc can be indicated by a graduated angular scale 66, which is provided on the outer surface of the disc or gear, and a stationary index or pointer 68. The disc or gear 64 may be angularly positioned through a worm drive 70 provided on a worm drive shaft 72 which may be rotated either manually or through a suitable gear reducer by the scanning motor 24. The scanning motor may be a fractional horsepower reversible D.C. motor and may be provided with an adjustable scanning control 74 which is adapted to adjust the voltage supplied to the armature of the scanning motor 24 for speed control purposes so that the crank angle scanning rate may be varied at will over different portions of the pressure-crank angle diagram.

The worm drive shaft 72 is also coupled through a reducer gear assembly to the position indicator transducer 26. The position transducer may be a linear potentiometer having a constant voltage applied across its end terminals so that the resulting voltage appearing between the center arm 76 and one of the terminals will represent the angular position of the capacity pickup probe. This voltage is supplied over electrical line 78 to one of the two self-balancing inputs of the chart recorder 40 to position the chart 42 thereof in accordance with the crank angle position of the capacity pickup probe. The recorder 40 may be a standard Brown recorder, the other input of which is supplied by the output of the pressure transducer 18 which develops an output voltage appearing on line 80 proportional to the balancing pressure supplied to the balanced diaphragm.

The recorder 40 may be housed in a console or control panel including the coincidence detector and error detector and may be located remotely away from the noise and heat generally associated with an engine test cell. The form of data plotted by the recorder is illustrated by the curves of Fig. 6 in which crank angle is plotted as the independent variable and pressure as the dependent variable. Since there is only one pressure for a given crank angle, as illustrated by the instantaneous pressure-time curve of Fig. 2, this method of plotting indicator diagrams affords some simplification of instrumentation problems over prior forms of pressure plotters in which pressure is plotted as the independent variable and crank angle as the dependent variable. In the latter case, it will be noted that there are at least two crank angles at which the cylinder pressure corresponds to a known balancing pressure applied to the balanced diaphragm indicator. Thus, special provisions must be taken to select only one "make" or "break" of the indicator each engine cycle or, if both the "make" and "break" occurrences for the rise and fall of the pressure diagram are being recorded, it will be necessary that the sensing apparatus operated from the balanced diaphragm has a sufficiently fast response time to follow the "make" and "break" action over the range of pressures involved.

In the operation of the present invention, the switching action caused by the closing and opening of the contacts of the balanced diaphragm indicator changes the potential on line 50 and develops in the coincidence detector a rectangular pulse A, such as is shown in Fig. 2, whose width corresponds to the interval during which the contacts of the indicator are closed. The pulse starts at the crank angle at which the cylinder pressure rises above the balance pressure and ends at the angle at which the cylinder pressure falls below the balance pressure.

The tooth or arm 57 of the pickup wheel 56 passes very close to the capacity pickup probe 54 once each wheel revolution and is at ground potential so that once each wheel revolution, corresponding to 720 engine degrees, a sharp change in the electrical capacitance between the pickup probe and ground is produced at a crank angle determined by the angular position of the probe. This change in capacitance is coupled over line 62 to the input of the coincidence detector 30 where it is transformed into an electrical pulse signal in the nature of that shown by the pulse B of Fig. 2.

The narrow pulse B is matched in the coincidence detector 30 with the broad square wave pulse A developed by the switching action of the balanced diaphragm indicator. If these pulses coincide during any portion of the interval over which the contacts of the balanced diaphragm are closed, as where the balancing pressure P1 is less than the instantaneous cylinder pressure P2 at the crank angle at which the timing pulse B occurs and the contacts of the diaphragm have closed in advance of the occurrence of the timing pulse, a coincidence pulse is developed by the coincidence detector and registered on the coincidence meter 31. If, on the other hand, the pulses A and B do not coincide, as where the pulse B occurs either before the contacts have closed or after they have opened corresponding to a condition where the balancing pressure is in excess of the cylinder pressure at the sampled crank angle, no coincidence pulse is produced. Thus, the presence or absence of a coincidence pulse in the coincidence detector will indicate qualitatively whether the balancing pressure is below or above the cylinder pressure at particular crank angle, and the balancing pressure may then be adjusted accordingly, manually or automatically.

The balancing pressure may be automatically adjusted by averaging the coincidence pulses to obtain a steady D.C. signal that is compared against a reference signal in the error detector 32 to obtain an error signal of such polarity as to cause the servo motor 36 to drive in the proper direction, either to increase or decrease the balancing pressure. An equilibrium condition is reached when the balancing pressure corresponds to the cylinder pressure for the crank angle at which the timing pulse occurs. This condition is indicated when the slightest change in the balancing pressure in one direction will cause the coincidence signal to disappear, and in the other direction to appear.

Since the cylinder pressure developed at any one specific crank angle is known to vary slightly from explosion to explosion due to cyclic variations of the engine, particularly in the combustion portion of the engine cycle, coincidence cannot be expected for each engine cycle. The present invention attempts to approximate or account for these cyclical variations by adjusting the serve loop equilibrium or balance point so that the balancing pressure will be above or below the cylinder pressure at the sampled crank angle for any preset portion of time, thereby simulating the cyclic fluctuations, and provides means for recording engine pressure diagrams wherein the recorded pressure is a median or any desired modified median of the cyclic variations. The manner in which the cyclic fluctuations are simulated and recorded may be understood from the following illustration.

Suppose, for instance, that the cylinder pressure at a specific crank angle is such that half the time the pressure is above, say, 100 p.s.i. and half the time it is below 100 p.s.i. due to cyclic fluctuations. Then, if the balance pressure were set at 100 p.s.i. and the timing mark generator pulse were produced at that specific crank angle, coincidence would occur but 50% of the possible time. The D.C. level derived from averaging the coincidence pulses would be exactly one half that produced if coincidence occurred 100% of the possible time. Therefore, if the reference voltage in the error detector is set to equal the averaged coincidence pulse voltage, the resulting error signal will be zero.

This setting of the error detector reference voltage would cause the servo system to assume an equilibrium condition such that the servo motor will adjust the balancing pressure on the diaphragm indicator so that 50% of the time it would be above 100 p.s.i. and 50% of the time below, whereby the recorded balancing pressure will be a median of the cyclic cylinder pressure variations. Thus, by adjusting the setting of the reference voltage any desired coincidence rate between 0 and 100% can be obtained to obtain a pressure indication or record which represents a pressure value which is exceeded by the cylinder pressure any preset or predetermined portion of time for any specific crank angle.

The circuit of the coincidence detector 30 is shown in Fig. 3 formed of a number of vacuum tube electronic stages and includes, in the order named, a link coupled oscillator stage V1, a voltage amplifier stage V2 whose output is differentiated and supplied to a clipper and inverter stage V3, a pulse generator constituted by V4 and V5, a gating stage V6, a delay multi-vibrator stage V7, and an output stage V8.

The oscillator stage V1 is link coupled over line 62 to the tuned capacity pickup probe 54 in the variable angle pulse generator and is tuned by the variable capacitor 100 shown in Fig. 3. Tuning the circuit through resonance causes a loading of the oscillator plate current, which is indicated on a meter 102 located in the cathode circuit of the oscillator tube. The link-coupled pickup capacity also affects the tuning of the oscillator.

Detuning the oscillator circuit to maximum slope, on either side of resonance, yields maximum sensitivity and linearity to small changes in pickup capacity. The change in plate current produces a voltage signal across cathode resistors 104 and 106. This signal voltage is coupled to the grid of the voltage amplifier stage V2 through a low pass filter formed by the inductance 110 and capacitance 112. The voltage at this point, produced by the timing mark pickup, is shown by the wave form of Fig. 5A. Circuit V2 is a conventional R.C. coupled amplifier which amplifies and inverts the input pulse of Fig. 5A into that shown by the wave form of Fig. 5B. The inverted pulse appearing at the plate of V2 is coupled to the grid of the first section V3A of the following stage through a differentiating network which is formed by condenser 116 and resistor 118 and produces the wave form of Fig. 5C. Tube V3A is biased below cut-off and conducts during the positive portion of wave form of Fig. 5C, producing the clipped wave form of Fig. 5D appearing at the plate of V3A. The pulse of Fig. 5D is applied to the grid of the normally conducting second section V3B of the clipper-inverter stage which is driven below cut-off by the pulse, producing the chopped wave form of Fig. 5E at the plate of V3B.

As previously discussed, the balanced diaphragm remote plotter system maintains an equilibrium point where the crank angle pulse coincides with the edge of the balanced diaphragm signal. It is necessary, therefore, that the crank angle pulse be of very short duration. Inasmuch as the crank angle pulse width represented by Fig. 5E is about 600 microseconds, a short pulse width generator is required at this point.

The pulse generator comprises the two pentodes, V4 and V5. A signal voltage corresponding to Fig. 5E is coupled to the grid of V4 through a differentiating network that is formed by condenser 122 and resistor 124 and produces a differentiated wave having the wave form of Fig. 5F. The grid bias of V5 is zero causing this tube to be normally conducting. The tubes V4 and V5 have a common cathode resistor 126 and the normal or quiescent current of V5 flowing through this resistor biases tube V4 below cutoff. The positive portion of the wave form of Fig. 5F causes V4 to conduct, producing a negative pulse at its output which is coupled to the grid circuit of V5, driving the grid of V5 well below cutoff. At the same time a tuned grid circuit located between V4 and V5, and consisting of an inductance 130 and the distributed capacitance of the circuit is set into oscillation. The grid of V5 returns to cathode potential in a time determined by the natural frequency of the tuned circuit. When the grid reaches the potential where V5 begins to conduct, a rapid regenerative cycle occurs, restoring the circuit to its original condition. As the tuned circuit, originally driven negative, swings positive the grid of V5 draws current which damps the oscillations. The oscillation is limited to one half cycle with the resulting voltage appearing at the plate of V5 shown by the wave form of Fig. 5G and having a pulse width of approximately 0.3 microsecond.

The 0.3 microsecond pulse of Fig. 5G is coupled to the suppressor grid of the gating tube V6. The balanced diaphragm indicator is connected between the control grid of V6 and ground and switches the potential thereon in the manner shown by the wave form of Fig. 5H. Both grids of V6 are negatively biased cutting off the tube. The shaped crank angle pulse of Fig. 5G applied to the suppressor grid will not cause V6 to conduct unless the control grid is grounded by the balanced diaphragm indicator. When coincidence occurs, however, the tube conducts and the wave form of Fig. 5I is produced at the plate of V6.

This pulse is used to trigger tube V7, which is a conventional unstable multivibrator circuit. The multivibrator generates a constant width, square wave, illustrated by the wave form of Fig. 5J whose amplitude is varied by the calibration adjustment potentiometer 132 in the output of the delay multivibrator. The positive square wave of Fig. 5J drives a cathode follower, V8, whose output is fed to the error detector input over conductor 136. This signal is shown by the wave of Fig. 5K.

The average plate current of the cathode follower, V8, is proportional to the amplitude, width and frequency of the voltage wave of Fig. 5J. The width of this square wave is constant, its amplitude is controlled by the calibration adjustment potentiometer 132 and its frequency is equal to the coincidence rate. The meter 31 in the V8 plate current averaging circuit indicates the average current in terms of percent coincidence.

The error detector circuit 32 illustrated in Fig. 4 includes a pulse averaging circuit 140 and a differential cathode follower circuit 142. The resulting coincidence signal of Fig. 5K appearing in the output of the coincidence detector is coupled to the pulse averaging circuit over conductor 136. The positive pulse of Fig. 5K has an amplitude E and is applied across a 0.02 micro-farad condenser C1 shown at 146 in series with a 1.0 micro-farad condenser C2 shown at 148 and a diode 150. A second diode 152, whose cathode is connected between C1 and diode 150 and whose anode is connected to ground, serves to clip any negative going portion of the input pulse applied to the pulse averaging circuit.

Since the condensers C1 and C2 are connected in series, the same amount of charge is deposited on each capacitor. Condenser C1 is much smaller than C2 so that substantially all of the voltage of the pulse of Fig. 5K is developed across the smaller condenser, which becomes fully charged during each pulse to a value $q=C_1E$. Since current is $i=dq/dt$, the discharge current of C2 through discharge resistor 154 may be expressed as $i_2=fq$, where $f$ is the pulse frequency. The circuit output voltage is $E_0=i_2R$, and inasmuch as $i_2=fq=f(C_1E)$, then $$E_0=[f(C_1E)]R$$

The D.C. output voltage of the pulse averaging circuit is, therefore, a function of pulse rate and amplitude.

In normal operating procedure, the coincidence detector circuit is adjusted so that the coincidence rate meter 31 is correctly calibrated. The calibration would normally vary with engine r.p.m. but is compensated for by manually adjusting the pulse amplitude. As a result, the product of amplitude and frequency of the voltage wave of Fig. 5K is constant at any specific percent coincidence rate. Therefore, the averaging circuit output voltage ($E_0=fC_1ER$) is constant at any specific percent coincidence rate regardless of engine r.p.m. if the coincidence detector is adjusted properly.

The output voltage of the pulse averaging circuit is applied to the grid 160 of the first section 142a of the differential cathode follower. The potential of the grid 162 of the second section 142b is set manually with an adjustable voltage divider network 164 connected across a regulated or constant source of direct voltage illustrated as a battery 166. The two cathodes 170 and 172 have symmetrical networks. A difference of voltage between the two grids unbalances the circuit and produces a corresponding difference of the cathode potentials. The cathode potential difference is applied to the input of the servo amplified 34 through a voltage divider network 176 over conductors 178 and 180. The output of the servo amplifier is connected over conductors 182 and 184 to the control phase winding 186 of the two phase servo motor 36 whose reference phase winding 188 is energized from a local source of A.C. The rotor of the servo motor is suitably mechanically coupled to the pressure regulator valve 16.

The coincidence circuit is calibrated and adjusted by running the engine at a constant speed to be used in the particular test and closing the pressure regulator valve 16 so that no pressure is applied to the balanced diaphragm indicator. The crank angle generator 22 is set to a crank angle where the cylinder pressure is known to be above atmospheric and the calibration adjust potentiometer 132 in the coincidence detector is adjusted until the coincidence meter 31 reads 100%. The regulator valve is then opened and the servo system will begin seeking the balance point, if the coincidence adjust potentiometer 164 in the error detector circuit is adjusted correctly. The latter potentiometer is set so that the pressure indicated on the recorder or a pressure gauge connected in line 48 increases when the coincidence rate meter 31 indicates 100% and decreases when the meter indicates 0% coincidence. Several minutes may elapse before the pressure reaches the equilibrium point. When equilibrium is reached, the reading of the coincidence rate meter will be somewhere between 0 and 100%, and the coincidence adjust potentiometer 164 can then be set to yield the desired coincidence rate.

The time constant of the pulse averaging circuit 140 is determined by the condenser 148 and resistor 154, and determines the time over which the coincident output pulses from the coincidence detector are averaged. Thus, with a time constant of, say, 1 second, if the engine were driven at a constant speed of, say, 1800 r.p.m. corresponding to 30 crankshaft and 15 camshaft revolutions per second, the cylinder pressure would be sampled 15 times each second. With a coincidence rate setting of 50 percent, there would be 7½ coincident pulses produced in the output of the coincidence detector which would be averaged or integrated over the 1 second averaging period of the pulse averaging circuit.

The crank angle scanning rate is controlled by the speed of the scanning motor 24 and should be sufficiently slow to allow an adequate number of cylinder pressure samplings to be taken at each crank angle, thereby to permit definite averaging of the cyclic fluctuations. In the above example, if the crank angle scanning rate were, say, at least 1 degree per second, there would be 15 pressure samplings from one full crank angle to another and the time required to record a complete pressure-time diagram would be in the order of about 12 minutes. However, it may be necessary to decrease the scanning speed by adjusting the motor scanning control 74 to increase recording time, particularly in the high pressure larger slope regions of the pressure time diagram where substantial cyclic fluctuations are exhibited, in order to obtain a sufficient number of pressure samplings for definite averaging in these regions.

Fig. 6 illustrates the form of record or plot that may be obtained with the present apparatus. Several diagrams taken at the same engine speed but at different coincidence levels may be recorded on the same chart in succession to obtain a family of curves, each of which represents pressures which are equal to or are exceeded by the cylinder pressure at each crank angle for a given percentage of explosion cycles or percentage of time over which the samplings are taken. The balanced diaphragm plotter of the present invention thus records averaged pressure curves which are exceeded by the instantaneous cylinder pressure curves a preset percentage of the number of cycles sampled. From a family of such curves an inverted cumulative distribution function curve, such as that shown in Fig. 7, may be derived for each crank angle statistically relating the distribution of cylinder pressures existing at a given crank angle.

What is claimed is:

1. Apparatus for obtaining a measure of the pressure existing within the cylinder of an internal combustion engine at a particular engine crank angle comprising, in combination, means developing a timing mark signal whose position in time and space corresponds to a predetermined crank angle position of said engine, means sampling the pressure within the engine cylinder including a balanced diaphragm transducer one side of the diaphragm of which is exposed to cylinder pressure and an adjustable source of balancing pressure supplied to the other side of said transducer diaphragm, said sampling means developing an electrical signal when the engine cylinder pressure on one side of the diaphragm attains the balancing pressure on the other side, coincidence detecting means connected to receive said timing mark signal and said balanced diaphragm transducer signal and producing an output coincidence pulse in the event of coincidence thereof, and servo follow-up means operated from said coincidence detecting means and connected to adjust said source of balancing pressure to maintain coincidence between said timing mark signal and said balanced diaphragm signal.

2. The combination in accordance with claim 1 above including means for adjusting the rate of coincidence between said balanced diaphragm transducer signal and said timing mark signal to any desired value, said means including an adjustable source of potential adjustable at will and connected in opposition to the output of said coincidence detecting means.

3. Apparatus for obtaining a measure of the pressure existing within the cylinder of an internal combustion engine at a particular crank angle comprising, in combination, means developing a timing mark signal whose position in time and space corresponds to a predetermined crank angle position of said engine, means sampling the pressure within the engine cylinder including a balanced diaphragm transducer one side of the diaphragm of which is exposed to cylinder pressure and an adjustable source of balancing pressure supplied to the other side of said transducer diaphragm, said sampling means developing an electrical signal when the cylinder pressure on one side of the diaphragm attains the balancing pressure on the other side thereof, coincidence detecting means connected to receive said timing mark signal and said balanced diaphragm transducer signal and developing a coincidence output signal in the event of coincidence thereof, error detector means connected to said coincidence detecting means including an adjustable source of potential connected in series opposition to the output of said coincidence detector, and servo follow-up means energized from said error detector and operatively connected to said source of balancing pressure.

4. Apparatus for obtaining engine indicator diagrams relating cylinder pressure with crank angle of an internal combustion engine comprising, in combination, means developing a timing mark signal whose position in time and space corresponds to a predetermined crank angle position, means for adjusting said last named means throughout the operating range of engine crank angles, means sampling the pressure within said engine including a balanced diaphragm transducer one side of which is exposed to engine cylinder pressure and an adjustable source of balancing pressure applied to the other side of said transducer diaphragm, said sampling means developing an electrical signal when the cylinder pressure on one side of the diaphragm attains said balancing pressure on the other side thereof, means comparing the occurrence in time of said balance diaphragm signal and said timing mark signal, and servo follow-up means operated from said comparison means and operatively connected to said adjustable source of balancing pressure for regulating the balancing pressure supplied to said balanced diaphragm transducer until said two signals coincide.

5. The combination in accordance with claim 4 above including drive means coupled to said adjusting means for said timing mark signal developing means and driving the same continuously and progressively over the operating range of engine crank angles.

6. The combination in accordance with claim 5 above including a pressure transducer connected between said pressure source and balanced diaphragm transducer developing an electrical signal representative on the balancing pressure supplied to said diaphragm, a position indicator coupled to said timing mark signal adjusting means and driven by said drive means for developing an electrical signal corresponding to the crank angle position of said timing mark signal, a two-axis indicating means connected to said pressure transducer and crank angle position indicating means.

References Cited in the file of this patent

UNITED STATES PATENTS

| | | |
|---|---|---|
| 2,085,203 | Schlesman et al. | June 29, 1937 |
| 2,688,248 | Hart et al. | Sept. 7, 1954 |
| 2,708,366 | Blocher et al. | May 17, 1955 |